US011768573B2

(12) United States Patent
Creager et al.

(10) Patent No.: US 11,768,573 B2
(45) Date of Patent: *Sep. 26, 2023

(54) GRAPHICAL USER INTERFACE MARKING FEEDBACK

(71) Applicant: TRUIST BANK, Charlotte, NC (US)

(72) Inventors: James Harrison Creager, Raleigh, NC (US); Daniel Jordan Schantz, Raleigh, NC (US); Brannan Rhett McDougald, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,085

(22) Filed: Jan. 6, 2023

(65) Prior Publication Data
US 2023/0152934 A1 May 18, 2023

Related U.S. Application Data

(63) Continuation of application No. 17/676,959, filed on Feb. 22, 2022, now Pat. No. 11,586,335, which is a continuation of application No. 16/923,327, filed on Jul. 8, 2020, now Pat. No. 11,327,625.

(60) Provisional application No. 62/875,189, filed on Jul. 17, 2019.

(51) Int. Cl.
*G06F 3/048* (2013.01)
*G06F 3/0481* (2022.01)
*G06Q 50/00* (2012.01)

(52) U.S. Cl.
CPC .......... *G06F 3/0481* (2013.01); *G06Q 50/01* (2013.01); *G06F 2203/04804* (2013.01)

(58) Field of Classification Search
CPC ..................... G06Q 50/01; G06Q 30/0201
See application file for complete search history.

(56) References Cited

U.S. PATENT DOCUMENTS 8,606,329 B2 * 12/2013 Yu et al. ............. G06F 16/9577
715/236
8,732,605 B1 * 5/2014 Falaki .................... G06Q 30/02
715/780
9,552,131 B2 * 1/2017 Chaudhri et al. .... G06F 3/0481
(Continued)

OTHER PUBLICATIONS

Mahajan et al., Detecting and Localizing Visual Inconsistencies in Web Applications, 2016, IEEE, 4 pages.*

*Primary Examiner* — Linh K Pham
(74) *Attorney, Agent, or Firm* — Kilpatrick Townsend & Stockton LLP; Michael A. Springs, Esq.

(57) ABSTRACT

A method for providing user feedback for a website includes generating, via a programming interface of a first computing device, a substantially transparent overlay for a graphical user interface (GUI) of a web page, the substantially transparent overlay preventing user interaction with the GUI of the web page, receiving coordinates of an area on the substantially transparent overlay, translating, by the first computing device, the coordinates of the area on the substantially transparent overlay to source code for an element on the GUI of the web page located at a corresponding position of the coordinates of the area on the substantially transparent overlay, and transmitting, by the first computing device, source code for the element to a second computing device for rendering the element on a second computing device GUI.

15 Claims, 8 Drawing Sheets

(56) References Cited

U.S. PATENT DOCUMENTS

| | | | |
|---|---|---|---|
| 2005/0198315 A1* | 9/2005 | Wesley et al. | G06Q 30/02 709/228 |
| 2007/0035775 A1* | 2/2007 | Asai | H04N 1/32229 382/100 |
| 2009/0047000 A1* | 2/2009 | Walikis et al. | G06F 16/4387 386/292 |
| 2010/0070851 A1* | 3/2010 | Chen et al. | G06F 16/986 715/236 |
| 2011/0066636 A1* | 3/2011 | Guido et al. | H04L 67/146 707/769 |
| 2012/0047234 A1* | 2/2012 | Terayoko | G06F 16/9577 709/219 |
| 2014/0223329 A1* | 8/2014 | Falaki et al. | G06F 13/00 715/747 |
| 2015/0033109 A1* | 1/2015 | Marek | G06F 16/438 715/230 |
| 2015/0253956 A1* | 9/2015 | Schantz et al. | G06F 3/0416 345/173 |
| 2015/0378492 A1* | 12/2015 | Rosenberg et al. | G06F 3/04144 345/174 |
| 2015/0378587 A1* | 12/2015 | Falaki et al. | G06F 3/0488 715/747 |
| 2016/0041954 A1* | 2/2016 | Bloch et al. | G06F 16/986 715/234 |
| 2016/0170570 A1* | 6/2016 | Zhang | G09G 5/14 715/733 |
| 2016/0313906 A1* | 10/2016 | Kilchenko et al. | G06Q 30/0269 |
| 2017/0064353 A1* | 3/2017 | Kim et al. | H04N 21/854 |
| 2017/0337166 A1* | 11/2017 | Falkenberg et al. | G06F 40/106 |
| 2018/0143950 A1* | 5/2018 | al-Arnaouti et al. | G06Q 50/01 |
| 2018/0143962 A1* | 5/2018 | Tremblay et al. | G06F 16/367 |
| 2018/0246983 A1* | 8/2018 | Rathod | G06F 16/9566 |
| 2020/0036749 A1* | 1/2020 | Ferres et al. | H04L 51/02 |
| 2020/0162561 A1* | 5/2020 | Milvaney et al. | G06F 9/542 |

\* cited by examiner

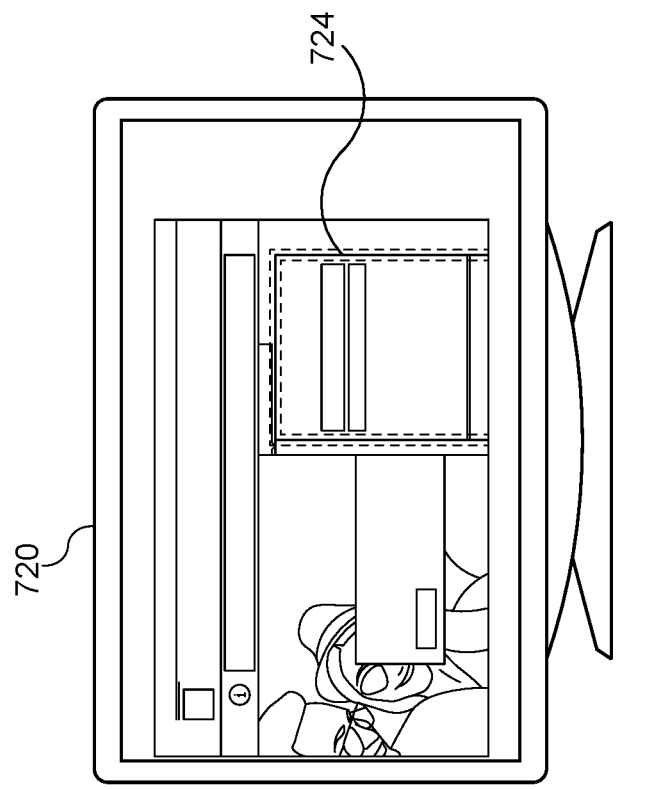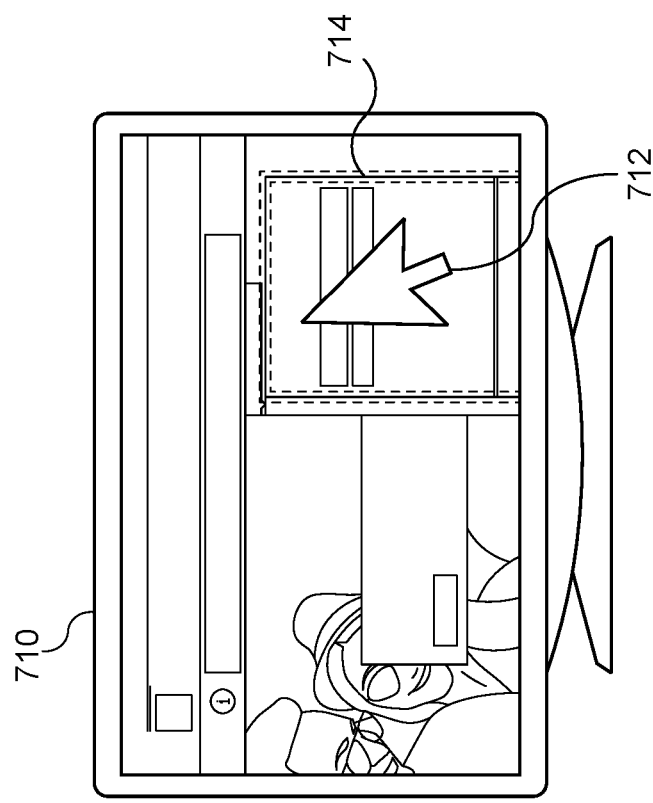
FIG. 7

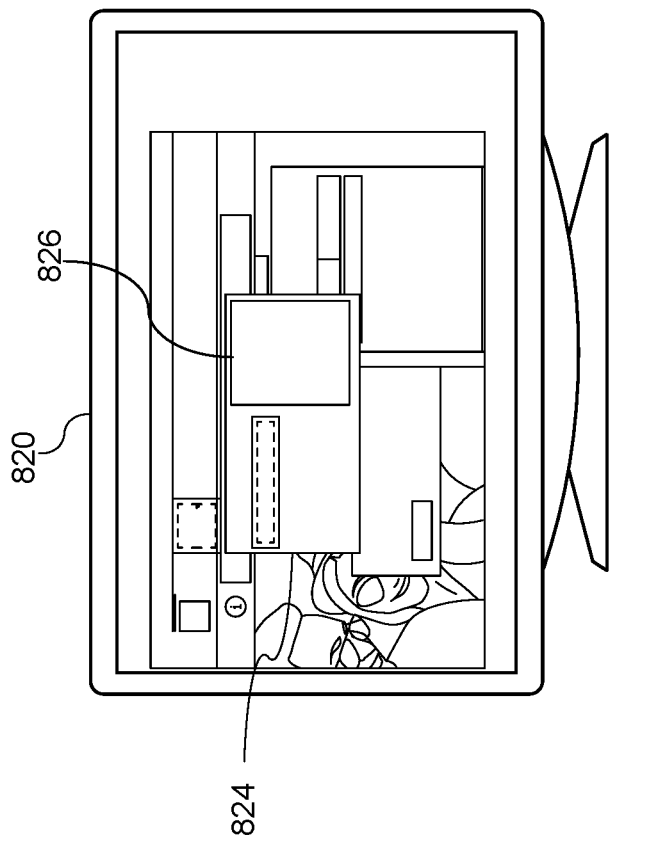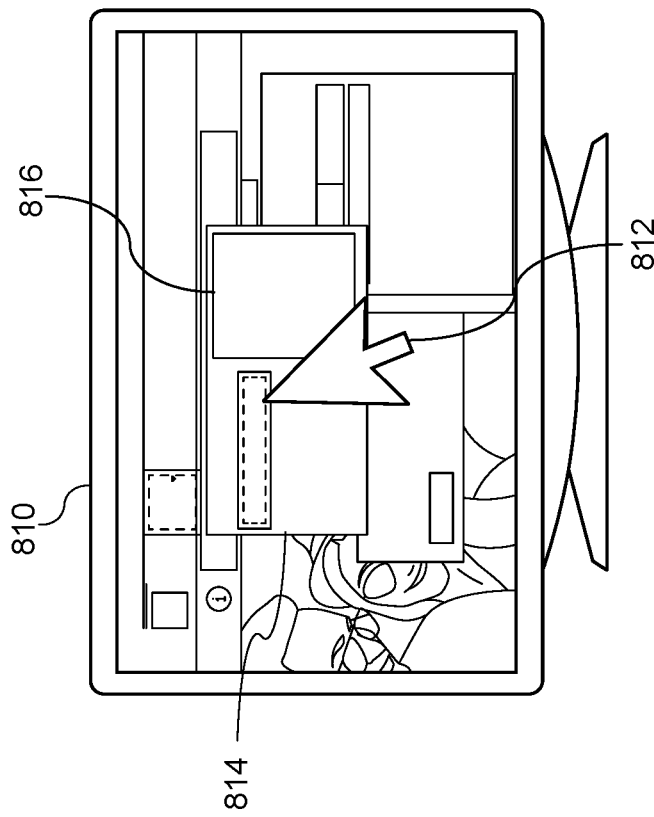
FIG. 8

GRAPHICAL USER INTERFACE MARKING FEEDBACK

CROSS-REFERENCE TO RELATED APPLICATION

This is a continuation of co-pending U.S. Pat. Application No. 17/676,959, filed Feb. 22, 2022, titled "Graphical User Interface Marking Feedback," which is a continuation of U.S. Pat. Application No. 16/923,327, filed Jul. 8, 2020, now U.S. Pat. No. 11,327,625, titled "Graphical User Interface Marking Feedback," which claims priority to U.S. Provisional Pat. Application No. 62/875,189, filed on Jul. 17, 2019, and titled "Graphical User Interface Marking Feedback," the disclosures of all of which are hereby incorporated by reference in their entireties.

TECHNICAL FIELD

The present disclosure relates generally to providing user feedback for a website, and more particularly, but not exclusively, to providing a graphical user interface overlay for a webpage to receive user input about the web page.

BACKGROUND

Website users sometimes experience issues that result in the users reporting problems with a web page or requesting assistance with the web site (e.g., navigating the web site). Inputs for feedback reporting can include free-response text boxes and rating scales. These inputs may not accurately capture interface specifics because the inputs rely on a user to describe the context in enough detail for a representative to be able to visualize or recreate the situation. Users may not be familiar with system behavior or the source code powering the system, which can make accurate reporting difficult. Other techniques may require a user to download or launch a screen-sharing program, or other extension.

SUMMARY

In one example, a method for providing user feedback for a website may include generating, via a programming interface of a first computing device, a substantially transparent overlay for a graphical user interface (GUI) of a web page. The substantially transparent overlay may prevent user interaction with the GUI of the web page. The method may further include receiving coordinates of an area on the substantially transparent overlay, translating, by the first computing device, the coordinates of the area on the substantially transparent overlay to source code for an element on the GUI of the web page located at a corresponding position of the coordinates of the area on the substantially transparent overlay, and transmitting, by the first computing device, source code for the element to a second computing device for rendering the element on a second computing device GUI.

In another example, a system may include a first computing device, and a second computing device configured to communicate with the first computing device. The first computing device may be configured to perform operations including generating, via a programming interface of the first computing device, a substantially transparent overlay for a graphical user interface (GUI) of a web page. The substantially transparent overlay may prevent user interaction with the GUI of the web page. The first computing device may be further configured to perform operations including receiving coordinates of an area on the substantially transparent overlay, translating the coordinates of the area on the substantially transparent overlay to source code for an element on the GUI of the web page located at a corresponding position of the coordinates of the area on the substantially transparent overlay, and transmitting, by the first computing device, the source code for the element to the second computing device for rendering the element on a second computing device GUI.

In a further example, a non-transitory computer readable medium may include instructions that are executable for performing operations including generating, via a programming interface of a first computing device, a substantially transparent overlay for a graphical user interface (GUI) of a web page. The substantially transparent overlay may prevent user interaction with the GUI of the web page. The instructions may further include receiving coordinates of an area on the substantially transparent overlay, translating, by the first computing device, the coordinates of the area on the substantially transparent overlay to source code for an element on the GUI of the web page located at a corresponding position of the coordinates of the area on the substantially transparent overlay; and transmitting, by the first computing device, the source code for the element to a second computing device for rendering the element on a second computing device GUI.

BRIEF DESCRIPTION OF THE DRAWINGS

FIG. 7 is a diagram illustrating an example of sending a screenshot for storage in a database using asynchronous communication according to some aspects of the present disclosure.

FIG. 8 is a diagram illustrating an example of synchronous communication between a user computer terminal and an agent computer terminal for assisting in menu navigation according to some aspects of the present disclosure.

DETAILED DESCRIPTION

Figure 1:
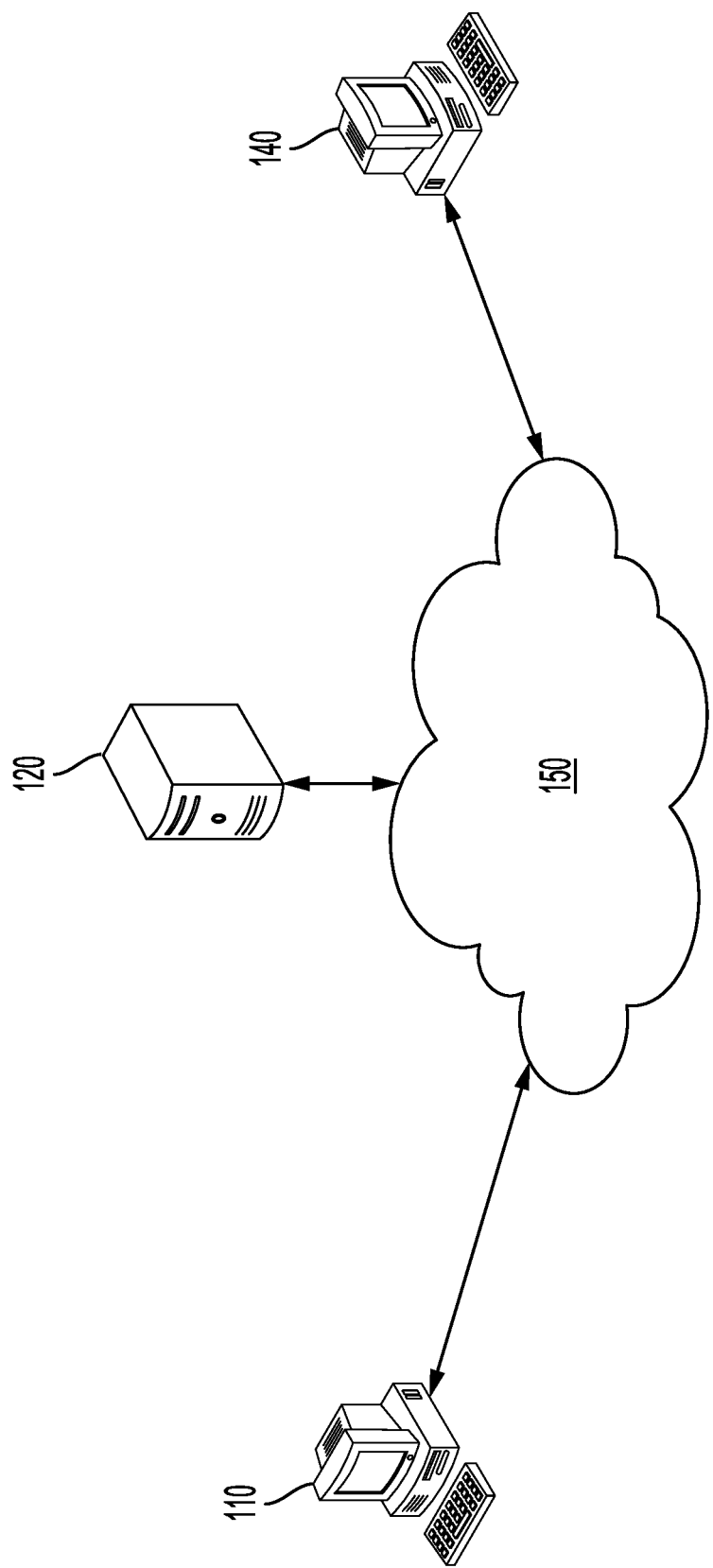
FIG. 1 is a diagram illustrating a communication path for implementing a graphical user interface (GUI) marking tool according to some aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Websites are built from web pages. Web pages are documents, typically composed in plain text interspersed with formatting instructions of Hypertext Markup Language (HTML) or extensible HTML (XHTML). Web pages may incorporate elements from other websites with suitable markup anchors that mark the beginning and the end of a hypertext link. A hypertext link enables a user to navigate to a new web page by clicking on the link with a mouse. Web pages are accessed and transported with the Hypertext Transfer Protocol (HTTP), which may optionally employ encryption (e.g., HTTP Secure (HTTPS)) to provide security and privacy for the user. A web browser may render web page content according to its HTML markup instructions onto a computer display.

In some cases, when viewing a web page, incidents may occur about which a user wishes to initiate a communication with the owner or operator (e.g., a customer service agent) of the website containing the web page. For example, the user may experience a broken link, an error message, a misspelled word, etc., or may be confused about how to navigate the web site. In such cases, the user may initiate a communication action (e.g., a chat, phone call, or feedback button press, etc.) with a receiver, for example, a human agent, a robot, or a database. The communication may be synchronous, for example, a live chat or phone call during which the user interacts with the receiver in real-time, or asynchronous in which the user sends the question or feedback for later review by the receiver.

Initiating the communication action can also initiate the graphical user interface (GUI) marking tool of the present disclosure. A GUI displays interactive visual objects that convey information, and represent actions that can be taken by the user. When the GUI marking tool is initiated, a substantially transparent graphical overlay of the current web page may be generated and a capture mode enabled. The substantially transparent graphical overlay may "grey-out" the web page while allowing the web page including text, graphics, tables, etc., to be visible, but any hyperlinks or other selectable aspects on the web page may be nonfunctional. The capture mode may enable a target screen element selection by which the user (or the receiver during synchronous communication) may select an area of the current screen display, for example by hovering or clicking and dragging with a mouse.

The target screen element information may be transmitted to the receiver and a visual interpretation of the target area may be rendered on the screen display of the receiver. The screen display of the receiver may mirror the screen display of the user. In the case of asynchronous communication, the target screen element information may be transmitted to the receiver and stored, for example in a database on a server, for later analysis by an analyst.

In some implementations, an overlay may be optional. JavaScript (JS) may be used to intercept user interactions, such as mouse clicks, direct the user interactions to the GUI marking tool, and stop propagation of the user interactions to the default event handlers. In another implementation, a Cascading Style Sheet (CSS) may be used to give an HTML element a style property that disables default pointer interaction with that element. For example, with the style property enabled, clicking a link does not activate the link. This property may be applied to every element on the web page during the selection phase. JavaScript may track user input behaviors, such as mouse pointer location, clicks, etc., based on a point of origin relative to a displayed document of window, and highlight or add HTML/CSS properties to a selected element of the web page.

Some examples of the GUI marking tool of the present disclosure can enable users to report the area of a GUI related to a problem without knowledge of the source code or operating states. Web page issues observed in the past, for example, an alert message that is no longer be visible leaving a blank area on the screen, as well as present problems and problems unrelated to user behavior (e.g., incorrectly spelled words) may be reported using the GUI marking tool.

FIG. 1 is a diagram illustrating a communication path for implementing the GUI marking tool according to some aspects of the present disclosure. Referring to FIG. 1, a user device 110 may display a webpage. The user device 110 may be, for example, a personal computer, a laptop, a mobile phone or other mobile device, or another computing device capable of displaying the webpage. The user device 110 may be capable of communicating with other devices over the network 150. The user device 110 may communicate with a server 120 via the network 150. The network 150 may be, for example, the Internet or another network. The user device 110 may request the webpage from the server 120 and the server 120 may serve the webpage to the user device 110 via the network 150. The server 120 may mediate communication between the user device 110 and an agent device 140 and may provide storage for data and transactions between the user device 110 and the agent device 140.

The agent device 140 may be a computer terminal of an owner or operator of the website or a computer terminal of a service representative responsible to maintain the website. The agent device 140 may be, for example, a personal computer, a laptop, a mobile device, or another computing device. The agent device 140 may be capable of communicating with other devices, including the server 120 and the user device 110, over the network 150. In some implementations, communication between the user device 110, the agent device 140, and the server 120 may be performed via a virtual private network (VPN) or peer-to-peer network connection.

According to some aspects of the present disclosure, a user may experience an issue with a web page displayed on the user device 110. The user may initiate a communication, for example a live chat, between the user device 110 and the agent device 140 via the network 150 and the server 120. Initiating the live chat may also initiate the GUI marking tool. The user may use the GUI marking tool to identify the problem area of the GUI of the user device 110. Information related to the problem area may be transmitted from the user device 110 to the agent device 140. The transmitted information may be used to render a visual reproduction of the GUI of the user device 110 on a display of the agent device. The visual reproduction of the GUI may show the problem area as identified by the user. The server 120 may also store the information related to the problem area transmitted from the user device 110 for further analysis.

Figure 2:
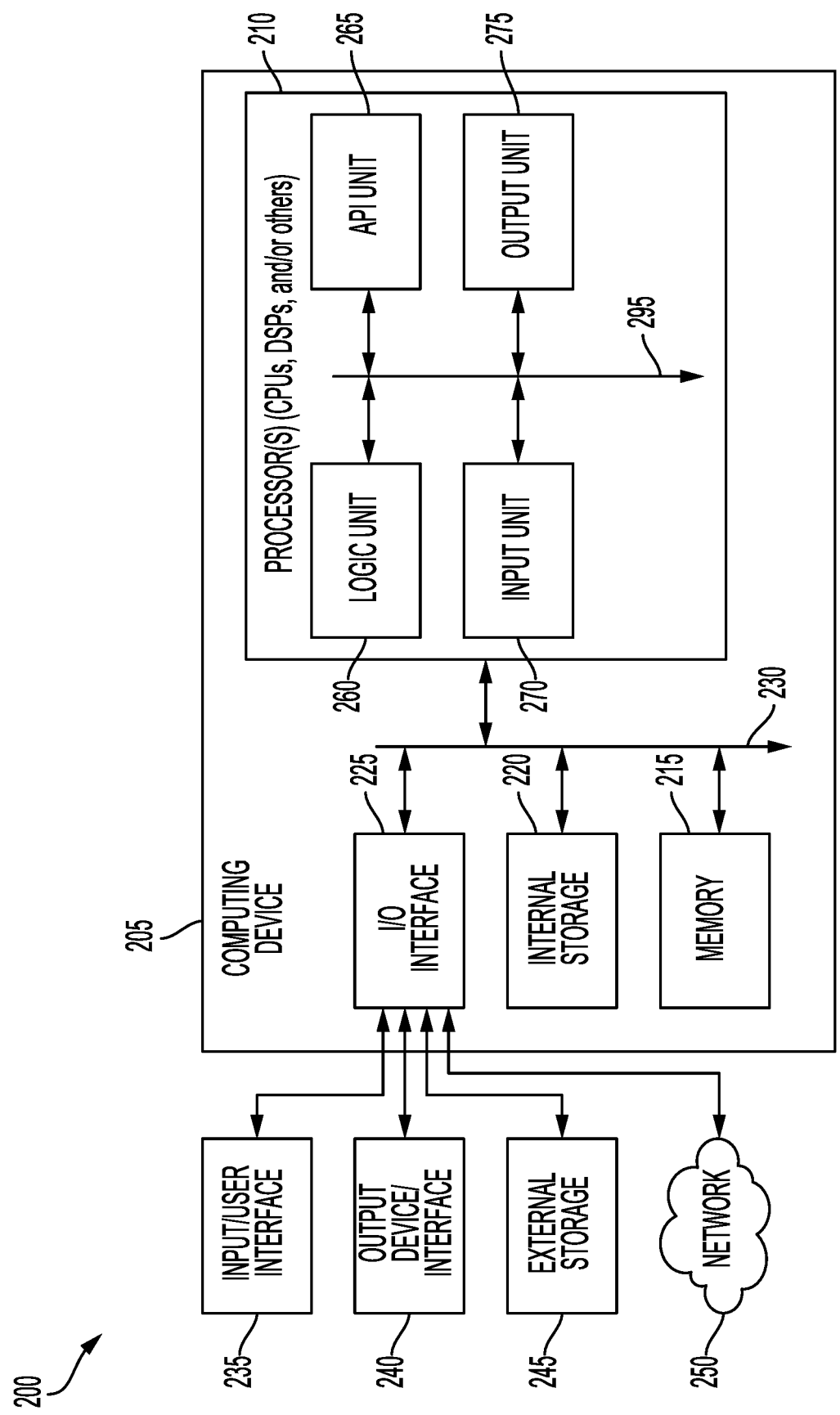
FIG. 2 is a block diagram of an example of a computing environment that includes a computing device suitable for use with a GUI marking tool according to some aspects of the present disclosure.

FIG. 2 is a block diagram of an example of a computing environment that includes a computing device 205 suitable for use with a GUI marking tool according to some aspects of the present disclosure. Any of the user device 110, the agent device 140, and the server 120 may be configured substantially similar to the computing device 205.

The computing device 205 in the computing environment 200 may include one or more processing units, cores, or processors 210, memory 215 (e.g., RAM, ROM, or the like), internal storage 220 (e.g., magnetic, optical, solid state storage, or organic), and I/O interface 225, any of which may be coupled on a communication mechanism or a bus 230 for communicating information or embedded in the computing device 205. As used herein, reference to a processing unit, core, or processor may include one processor or more than one processor.

The computing device 205 may be communicatively coupled to an input/user interface 235 and an output device/interface 240. Either one or both of the input/user interface 235 and the output device/interface 240 may be a wired or wireless interface. The input/user interface 235 may include any device, component, sensor, or interface, physical or virtual, that can be used to provide input (e.g., buttons, touch-screen interface, keyboard, a pointing/cursor control, microphone, camera, or the like) to the computing device 205. The output device/interface 240 may include a display, television, monitor, printer, speaker, or the like. In some example implementations, the input/user interface 235 and the output device/interface 240 may be embedded with or physically coupled to the computing device 205. Examples of the computing device 205 may include, but are not limited to, mobile devices (e.g., tablets, notebooks, laptops, personal computers, portable televisions, radios, and the like), and devices not designed for mobility (e.g., desktop computers, other computers, and the like).

The computing device 205 may be communicatively coupled (e.g., via the I/O interface 225) to an external storage device 245, a network 250 for communicating with any number of networked components, devices, and systems, including one or more computing devices of the same or different configuration, etc. The computing device 205 or any connected computing device may be functioning as, providing services of, or referred to as a server, client, thin server, general machine, special-purpose machine, or another label.

The I/O interface 225 may include, but is not limited to, wired and wireless interfaces using any communication or I/O protocols or standards (e.g., Ethernet, 802.11x, Universal System Bus, WiMax, modem, a cellular network protocol, and the like) for communicating information to and from at least all the connected components, devices, and network in the computing environment 200. The network 250 may be any network or combination of networks (e.g., the Internet, local area network, wide area network, a telephonic network, a cellular network, satellite network, and the like).

The computing device 205 can use or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

The computing device 205 can be used to implement techniques, methods, applications, processes, or computer-executable instructions in some example computing environments. Computer-executable instructions can be retrieved from transitory media, and stored on and retrieved from non-transitory media. The executable instructions may originate from one or more of any programming, scripting, and machine languages (e.g., C, C++, C#, Java, Visual Basic, Python, Perl, JavaScript, and others).

The processor(s) 210 may execute under any operating system (OS) (not shown), in a native or virtual environment. One or more applications may be deployed that a include logic unit 260, an application programming interface (API) unit 265, an input unit 270, an output unit 275, and an inter-unit communication mechanism 295 for the different units to communicate with each other, with the OS, and with other applications (not shown). The described units and elements can be varied in design, function, configuration, or implementation and are not limited to the descriptions provided.

In some example implementations, when information or an execution instruction is received by the API unit 265, it may be communicated to one or more other units (e.g., the logic unit 260, the input unit 270, the output unit 275).

In some instances, the logic unit 260 may be configured to control the information flow among the units and direct the services provided by the API unit 265, the input unit 270, the output unit 275 in some example implementations described above. For example, the flow of one or more processes or implementations may be controlled by the logic unit 260 alone or in conjunction with the API unit 265.

In accordance with some aspects of the present disclosure, software code may be embedded in a client-side software-programming interface, such as a website or mobile application. The software code may enable communication between the server and agent device of the website operator. The communication may be asynchronous or synchronous.

In the case of asynchronous communication, a user may initiate a feedback process by, for example, clicking on or otherwise selecting a selectable feature such as a feedback button overlayed on a portion of a GUI. Receiving the selection of the selectable feature may cause the code for the GUI marking tool to initiate a selection process as part of the feedback process. The code for the GUI marking tool may cause the processor of the user device to generate a substantially transparent overlay over the existing GUI elements of the webpage on the display of the user device. The substantially transparent overlay may be generated using a combination of JavaScript, HTML, and CSS.

The overlayed GUI may "grey-out" the web page while allowing the web page including text, graphics, tables, etc., to be visible, but preventing direct interaction by the user with the underlying GUI of the webpage. Instructions on how to proceed, for example, instructions to select an area causing an issue to be reported, may be displayed. The user may then select (i.e., mark) an area of the web page on which to provide feedback.

The selection (or marking) procedure may be performed in different ways. For example, when the user hovers the mouse cursor for a specified period of time over an element in the underlying GUI, the processor of the user device may cause that element to be highlighted. When the user clicks the mouse on a highlighted element, that element is marked and the highlight persists when the mouse cursor leaves that area. In another example, when the user performs a drag and release of the mouse, a shape that serves as the marker is rendered in the area of the interaction based on the length and width of the drag. In still another example, shapes of a predetermined size may be rendered by the processor of the user device at each location clicked by the user. The rendered shape may be, for example, a transparent box, circle, or other shape having a defined outline. Other ways of interacting with the code for the GUI marking tool may be used, for example, but not limited to, styluses, motion-interactive interfaces, finger touch, keyboard, eye-trackers, ear-trackers, face trackers, and code commands. The selection (marking) procedure may create new GUI elements on the overlayed GUI.

In some implementations, the overlay and capture mode may be temporarily disabled, allowing the user to manipulate the GUI into a correct representative state for providing feedback, if the GUI was not already in the desired state when the GUI marking tool was initiated. The GUI marking tool may allow the overlay and capture mode to be temporarily disabled while a key on the keyboard is held down. For example, a user wants to capture an expanded menu, but the menu is not expanded when the GUI marking tool is initiated, the user may hold down a keyboard key, expand the menu, and release the keyboard key. When the key is released, the overlay and capture mode may enabled and return to their last active state with the menu expanded.

To create the overlayed GUI elements, the code for the GUI marking tool may monitor the user device for interaction behaviors from a user, such as mouse hovers or mouse clicks. The interaction behaviors may indicate that a marking procedure is being performed. Based on a determination that a selection (marking) procedure is being performed, the code for the GUI marking tool may create and render new GUI elements on the overlay at the locations of the interactions to indicate where interaction behaviors occurred. One or more new GUI elements that overlay the existing GUI may be created and rendered on the display of the user device. The user device (e.g., the processor) may receive and store in memory the input from the selection procedure indicating the locations, for example the X and Y coordinates of the rendered GUI elements on the overlay.

The code for the GUI marking tool may cause the user device to monitor for a concluding event that indicates the marking procedure is complete. A concluding event can be generated in multiple ways. For example, after marking a specified number of locations, the concluding event could automatically be generated and sent by the code for the GUI marking tool. In some implementations, the code for the GUI marking tool may generate a user-interactive feature, such as a button, that when selected sends a concluding event that is received by the processor of the user device indicating that the selection process is complete.

Upon conclusion of the marking procedure (e.g., after the user device receives the concluding event indication), the code for the GUI marking tool may cause the user device to initiate a translation process to translate the stored input indicating the locations of the rendered GUI elements on the overlay to corresponding elements on the GUI of the original web page. For example, a software library function or another means may be used to determine the coordinates of the elements on the original web page GUI. The processor or other logic unit of the user device can then correlate the coordinates of the original web page elements with the new GUI elements rendered on the overlay to determine the web page elements selected during the selection process.

The code for the GUI marking tool may cause the processor or other logic unit of the user device to identify GUI source code, such as HTML tags in a webpage, corresponding to the same X and Y coordinates and in some case at different depths on the z axis, for example behind a modal overlay of the web page GUI, as the marked locations, and may record information about the identified GUI source code (i.e., a source code record), for example in a memory of the user device. Recording the information about the identified GUI source code can occur in multiple ways. For example, an element of a webpage could be recorded as an entire HTML tag, an HTML id attribute of the HTML tag, or the entire HTML document with an additional CSS class added to the HTML tag.

Additionally or alternatively, the code for the GUI marking tool may cause the user device to generate one or more image files (e.g., .png, .jpeg, etc.) depicting the current state of the underlying GUI (without markers), the markers, or the markers overlaying the underlying GUI that may also be stored, at least temporarily, in the memory of the user device. For example, after rendering a new GUI elements, the code for the GUI marking tool may cause the user device to generate a screenshot using the HTML DOM and CSS styling (i.e., the Document Object Model programming interface and Cascading Style Sheet styling) to render the image.

The code for the GUI marking tool may cause the user device to transmit the information to a remote server, for example via a network socket. The information may include, for example, but not limited to, the one or more generated image files, the source code record, information about the system including state-based information of the GUI, information about the user system (e.g., internet browser, application version, etc.), and information about the user (e.g., unique user identifiers, etc.). The visual representation can be complementary to a written description provided by the user. The server may associate the information with a transaction (e.g., a user problem report) and may store the information for later retrieval and analysis by an analyst.

In situations where the communication is synchronous (e.g., live chat, intelligent algorithm, etc.), the client-side (i.e., user) software programming interface may cause a processor of the user device to monitor for an event to prompt the user device to initiate the feedback process. The processor may be, for example, the central processing unit (CPU) or other logic unit of the user device. The event received by the processor may be, for example, but not limited to, an event initiated by a user feedback button, an event initiated by a remote agent, an event imitated by a remote computer algorithm, etc.

For example, an agent or service representative (e.g., a live chat representative) may need clarification on a portion of a web page where a problem is occurring while discussing the problem with a user. The live chat representative may send an initiating event from their remote system to the client-side (i.e., user) live chat software, and the live chat software may send the initiating event to the GUI event handler. The GUI event handler may then notify the code for the GUI marking tool and the code for the GUI marking tool may cause processor or other logic unit of the user device to modify the web page as explained above with respect to the asynchronous communication process.

In some implementations, a remote intelligent computer algorithm may observe user behavior and detect signs of a potential problem. For example, a user who experiences frustration with a broken link may click the link many times within a short time period. The remote intelligent computer algorithm may detect the multiple clicks, determine that the sequence of behavior is a situation where feedback is desired, and initiate the feedback process. The remote intelligent computer algorithm may send the initiating event directly to the code for the GUI marking tool through a network socket connection (i.e., a two-way communication link between two programs). Upon receiving a valid initiating event, the selection and translation processes may proceed as explained above with respect to the asynchronous communication process.

After completion of the selection and translation processes, the code for the GUI marking tool may cause the user device to transmit the information to a remote server, for example via a network socket. The information may include, for example, but not limited to, the one or more generated image files, the source code record, information about the system including state-based information of the GUI, information about the user system (e.g., internet browser, application version, etc.), and information about the user (e.g., unique user identifiers, etc.). The server may associate the information with a transaction (e.g., a user problem report) and may store the information, for example in a database. The server may also transmit the information to an agent device during synchronous communication between the user device and the agent device.

The code for the GUI marking tool on the receiving device (e.g., the agent device 140) may cause the receiving device to render a representation of the marked areas of the web page in real time. In some cases, the one or more generated image files of the web page may be received and the receiving device may display the received web page images. In some cases, the HTML source code for the marked up web page (i.e., the web page including the added GUI elements) may be received and rendered. In some cases, for example when the receiving device can access the web page from the server, only the HTML source code for the new GUI element may transmitted by the user device and rendered by the receiving device on the same web page.

In some implementations, similar marking, selection, and translation processes may be used to enable an agent to provide a modified web page to a user for instructional purposes. For example, if a user is speaking to a support agent about a menu item that cannot be located, the support agent could use the GUI marking process to mark the menu item and show the user where it is located.

Figure 3:
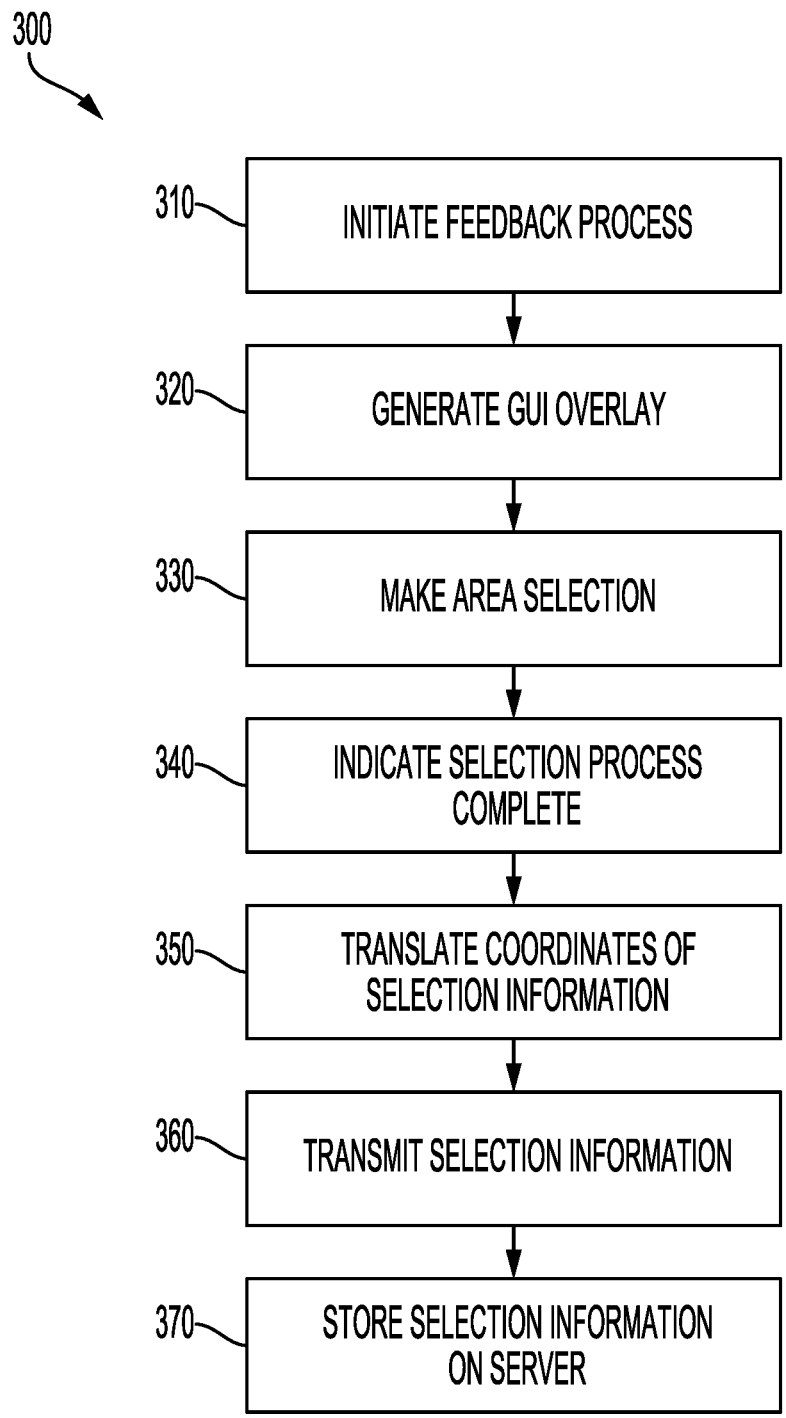
FIG. 3 is a flowchart illustrating an example of a method for providing GUI marking feedback with asynchronous communication according to some aspects of the present disclosure.

FIG. 3 is a flowchart illustrating an example of a method for providing GUI marking feedback with asynchronous communication according to some aspects of the present disclosure. Referring to FIG. 3, at block 310, a feedback process involving a user device may be initiated. For example, a user may experience an issue with a web page and wish to provide feedback to the operator of the website. In some implementations, the user may perform a selection action, for example a mouse click, on an indicated area, for example a "feedback" or "help" button displayed on the GUI. For example, code for the GUI marking tool may cause the user device to generate and display the "feedback" or "help" button. The user device may receive the button press, for example via a mouse click, and code for the GUI marking tool may cause the user device (e.g., via the processor or other logic unit) to initiate the feedback process.

At block 320, substantially transparent overlay of the GUI of the web page may be generated. For example, when the feedback process is initiated, the code for the GUI marking tool may cause the processor or other logic unit of the user device to generate the substantially transparent overlay on the GUI displayed on the user device. In some implementations, the overlay may "grey-out" the web page while allowing the web page including text, graphics, tables, etc., to be visible, but preventing direct interaction by the user with the underlying GUI of the webpage. Instructions may be displayed to the user via the overlayed GUI to select an area of the web page related to the issue.

At block 330, the user may select an area of the web page. For example, the user may hover the mouse cursor over an element in the underlying GUI to highlight the area and click the mouse on the highlighted element to select it, perform a drag and release of the mouse to cause a shape to be rendered in the area, perform a mouse click to cause shapes of a predetermined size to be rendered at the location clicked by the user, etc. Other ways of selecting an area may be employed, for example, but not limited to, using styluses, motion-interactive interfaces, finger touch, keyboard, eye-trackers, ear-trackers, face trackers, and code commands.

To create the overlayed GUI elements, the code for the GUI marking tool may monitor the user device for interaction behaviors from a user, such as mouse hovers or mouse clicks. The interaction behaviors may indicate that a marking procedure is being performed. Based on a determination that a selection (marking) procedure is being performed, the code for the GUI marking tool may create and render new GUI elements on the overlay at the locations of the interactions to indicate where interaction behaviors occurred. One or more new GUI elements that overlay the existing GUI may be created and rendered on the display of the user device. The user device (e.g., the processor) may receive and store in memory the input from the selection procedure indicating the locations, for example the X and Y coordinates of the rendered GUI elements on the overlay.

At block 340, an indication that the selection process is complete may be generated. The code for the GUI marking tool may cause the user device to monitor for a concluding event that indicates the marking procedure is complete. A concluding event can be generated in multiple ways. For example, after marking a specified number of locations, the concluding event could automatically be generated and sent by the code for the GUI marking tool. In some implementations, the code for the GUI marking tool may generate a user-interactive feature, such as a button, that when selected sends a concluding event that is received by the processor of the user device indicating that the selection process is complete.

At block 350, the coordinates of the selection information may be translated to the coordinates of the underlying web page. The code for the GUI marking tool may cause the user device to initiate a translation process to translate the stored input indicating the locations of the rendered GUI elements on the overlay to corresponding elements on the GUI of the original web page. For example, a software library function or another means may be used to determine the coordinates of the elements on the original web page GUI. The processor or other logic unit of the user device can then correlate the coordinates of the original web page elements with the new GUI elements rendered on the overlay to determine the web page elements selected during the selection process.

The code for the GUI marking tool may cause the processor or other logic unit of the user device to identify GUI source code, such as HTML tags in a webpage, corresponding to the same X and Y coordinates and in some case at different depths on the z axis, for example behind a modal overlay of the web page GUI, as the marked locations, and may record information about the identified GUI source code (i.e., a source code record), for example in a memory of the user device. Recording the information about the identified GUI source code can occur in multiple ways. For example, an element of a webpage could be recorded as an entire HTML tag, an HTML id attribute of the HTML tag, or the entire HTML document with an additional CSS class added to the HTML tag.

Additionally or alternatively, the code for the GUI marking tool may cause the user device to generate one or more image files (e.g., .png, .jpeg, etc.) depicting the current state of the underlying GUI (without markers), the markers, or the markers overlaying the underlying GUI that may also be stored, at least temporarily, in the memory of the user device. For example, after rendering a new GUI elements, the code for the GUI marking tool may cause the user device to generate a screenshot using the HTML DOM and CSS styling (i.e., the Document Object Model programming interface and Cascading Style Sheet styling) to render the image.

At block 360, the selection information may be transmitted to the server. The code for the GUI marking tool may cause the user device to transmit the information to a remote server, for example via a network socket. The information may include, for example, but not limited to, the one or more generated image files, the source code record, information about the system including state-based information of the GUI, information about the user system (e.g., internet browser, application version, etc.), and information about the user (e.g., unique user identifiers, etc.). The visual representation can be complementary to a written description provided by the user.

At block 370, the selection information may be stored on the server. The server may associate the information with a transaction (e.g., a user problem report) and may store the information in a database in internal or external storage for later retrieval and analysis by an analyst.

Figure 4:
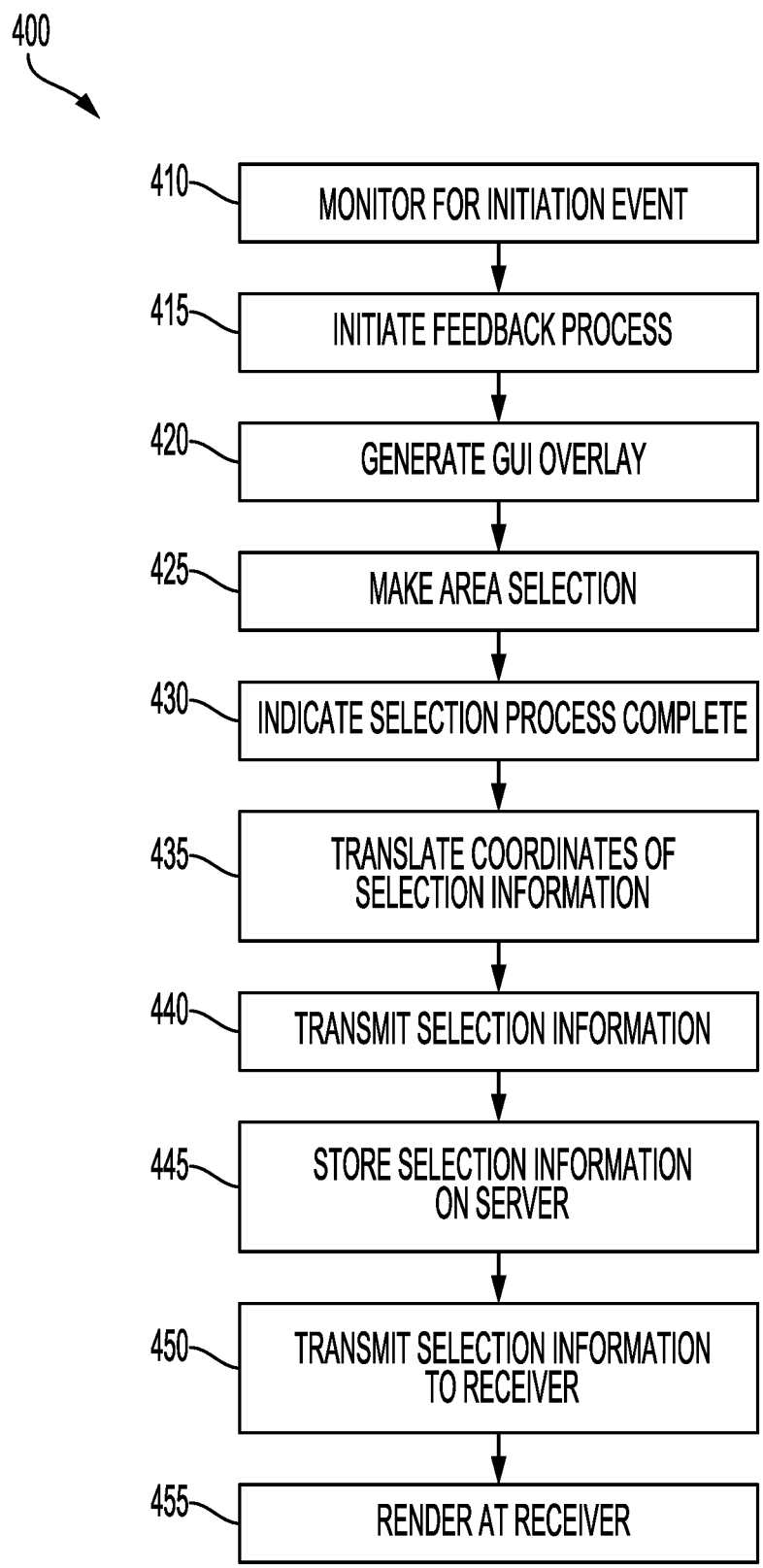
FIG. 4 is a flowchart illustrating an example of a method for providing GUI marking feedback with synchronous communication according to some aspects of the present disclosure.

FIG. 4 is a flowchart illustrating an example of a method 400 for providing GUI feedback with synchronous communication according to some aspects of the present disclosure. Referring to FIG. 4, at block 410 a user may experience an issue with a web page and wish to obtain assistance from the operator of the website. In some implementations, the user may be in communication with a live chat agent. In some implementations, the user may be in communication with an intelligent algorithm executing on a server. During the communication session, the client-side (i.e., user) software-programming interface may cause a processor of the user device to monitor for an event to prompt the user device to initiate the feedback process. The live chat agent or intelligent algorithm may generate the event and transmit the initiating event to the user device.

At block 415, the transmitted initiating event may be received by the processor of the client device. The initiating event may be transmitted from the remote system may be received by the client-side (i.e., user) live chat software, and the live chat software may send the initiating event to the GUI event handler. The GUI event handler may then notify the code for the GUI marking tool and the code for the GUI marking tool may cause the processor or other logic unit of the user device to initiate the feedback process at the user device.

At block 420, a substantially transparent overlay of the GUI of the web page may be generated. For example, when the feedback process is initiated, the code for the GUI marking tool may cause the processor or other logic unit of the user device to generate the substantially transparent overlay on the GUI displayed on the user device. In some implementations, the overlay may "grey-out" the web page while allowing the web page including text, graphics, tables, etc., to be visible, but preventing direct interaction by the user with the underlying GUI of the webpage. Instructions may be displayed to the user via the overlayed GUI to select an area of the web page related to the issue.

At block 425, the user may select an area of the web page. For example, the user may hover the mouse cursor over an element in the underlying GUI to highlight the area and click the mouse on the highlighted element to select it to cause a shape to be rendered, perform a drag and release of the mouse to cause a shape to be rendered in the area, perform a mouse click to cause shapes of a predetermined size to be rendered at the location clicked by the user, etc. The rendered shape may be, for example, a transparent box, circle, or other shape having a defined outline. Other ways of selecting an area may be employed, for example, but not limited to, using styluses, motion-interactive interfaces, finger touch, keyboard, eye-trackers, ear-trackers, face trackers, and code commands.

To create the overlayed GUI elements, the code for the GUI marking tool may monitor the user device for interaction behaviors from a user, such as mouse hovers or mouse clicks. The interaction behaviors may indicate that a marking procedure is being performed. Based on a determination that a selection (marking) procedure is being performed, the code for the GUI marking tool may create and render new GUI elements on the overlay at the locations of the interactions to indicate where interaction behaviors occurred. One or more new GUI elements that overlay the existing GUI may be created and rendered on the display of the user device. The user device (e.g., the processor) may receive and store in memory the input from the selection procedure indicating the locations, for example the X and Y coordinates of the rendered GUI elements on the overlay.

At block 430, an indication that the selection process is complete may be generated. The code for the GUI marking tool may cause the user device to monitor for a concluding event that indicates the marking procedure is complete. A concluding event can be generated in multiple ways. For example, after marking a specified number of locations, the concluding event could automatically be generated and sent by the code for the GUI marking tool. In some implementations, the code for the GUI marking tool may generate a user-interactive feature, such as a button, that when selected sends a concluding event that is received by the processor of the user device indicating that the selection process is complete.

At block 435, the coordinates of the selection information may be translated to the coordinates of the underlying web page. The code for the GUI marking tool may cause the user device to initiate a translation process to translate the stored input indicating the locations of the rendered GUI elements on the overlay to corresponding elements on the GUI of the original web page. For example, a software library function or another means may be used to determine the coordinates of the elements on the original web page GUI. The processor or other logic unit of the user device can then correlate the coordinates of the original web page elements with the new GUI elements rendered on the overlay to determine the web page elements selected during the selection process.

The code for the GUI marking tool may cause the processor or other logic unit of the user device to identify GUI source code, such as HTML tags in a webpage, corresponding to the same X and Y coordinates and in some case at different depths on the z axis, for example behind a modal overlay of the web page GUI, as the marked locations, and may record information about the identified GUI source code (i.e., a source code record), for example in a memory of the user device. Recording the information about the identified GUI source code can occur in multiple ways. For example, an element of a webpage could be recorded as an entire HTML tag, an HTML id attribute of the HTML tag, or the entire HTML document with an additional CSS class added to the HTML tag.

Additionally or alternatively, the code for the GUI marking tool may cause the user device to generate one or more image files (e.g., .png, .jpeg, etc.) depicting the current state of the underlying GUI (without markers), the markers, or the markers overlaying the underlying GUI that may also be stored, at least temporarily, in the memory of the user device. For example, after rendering a new GUI elements, the code for the GUI marking tool may cause the user device to generate a screenshot using the HTML DOM and CSS styling (i.e., the Document Object Model programming interface and Cascading Style Sheet styling) to render the image.

At block 440, the selection information may be transmitted to the server. The code for the GUI marking tool may cause the user device to transmit the information to a remote server, for example via a network socket. The information may include, for example, but not limited to, the one or more generated image files, the source code record, information about the system including state-based information of the GUI, information about the user system (e.g., internet browser, application version, etc.), and information about the user (e.g., unique user identifiers, etc.). The visual representation can be complementary to a written description provided by the user.

At block 445, the selection information may be stored on the server. The server may associate the information with a transaction (e.g., a user problem report) and may store the information in a database in internal or external storage. The server may also transmit the information to an agent device during synchronous communication between the user device and the agent device.

At block 450, the selection information may be transmitted to the receiver device. The server may also transmit the information to an agent device during synchronous communication between the user device and the agent device.

At block 455, The code for the GUI marking tool on the receiving device (e.g., the agent device 140) may cause the receiving device to render a representation of the marked areas of the web page in real time. In some cases, the one or more generated image files of the web page may be received and the receiving device may display the received web page images. In some cases, the HTML source code for the marked up web page (i.e., the web page including the added GUI elements) may be received and rendered. In some cases, for example when the receiving device can access the web page from the server, only the HTML source code for the new GUI element may transmitted by the user device and rendered by the receiving device on the same web page.

It should be appreciated that the specific steps illustrated in FIGS. 3 and 4 provide particular methods for providing graphical user interface marking feedback according to embodiments of the present invention. Other sequences of steps may also be performed according to alternative embodiments. For example, alternative embodiments of the present invention may perform the steps outlined above in a different order. Moreover, the individual steps illustrated in FIGS. 3 and 4 may include multiple sub-steps that may be performed in various sequences as appropriate to the individual step. Furthermore, additional steps may be added or removed depending on the particular applications. For example, in some implementations, an overlay may be optional. JavaScript (JS) may be used to intercept user interactions and stop propagation of the user interactions to the default event handlers, or CSS may be used to give an HTML element a style property that disables default pointer interaction with that element. One of ordinary skill in the art would recognize many variations, modifications, and alternatives.

The methods 300 and 400 may be embodied on a non-transitory computer readable medium, for example, but not limited to, a memory of user device 110, agent device 140, or other non-transitory computer readable medium, having stored therein a program including computer executable instructions for making a processor, computer, or other programmable device execute the operations of the methods.

Figure 5:
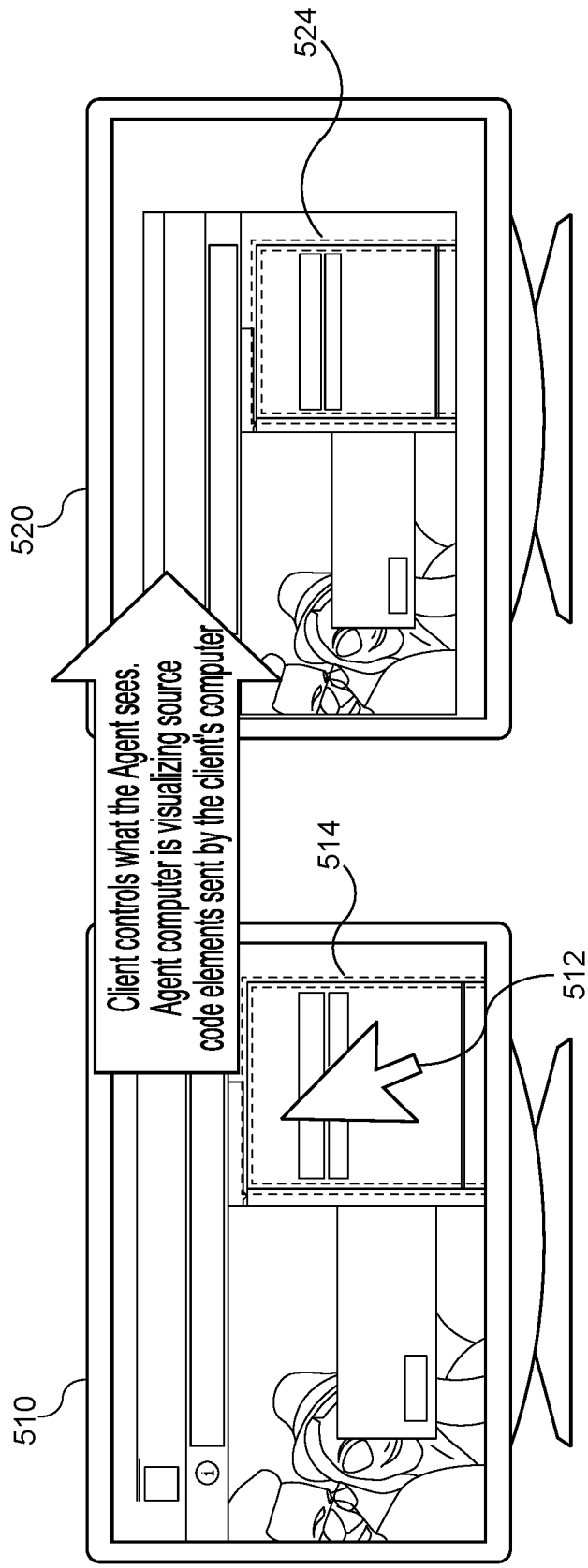
FIG. 5 is a diagram illustrating an example of synchronous communication between a user computer terminal and an agent computer terminal according to some aspects of the present disclosure.

FIG. 5 is a diagram illustrating an example of synchronous communication between a user device and an agent device according to some aspects of the present disclosure. As illustrated in FIG. 5, using the feedback process according to aspects of the present disclosure, selection information, for example source code corresponding to the selected area on the GUI of the user device 510, is transmitted by the user device 510 and rendered on the agent device 520 to enable the agent to visualize the GUI as seen by the user.

Using synchronous communication, the user of the user device 510 may control the information seen by the agent on the agent device 520. The agent device 520 may render a visualization of the source code elements transmitted by the user device 510. For example, the user of the user device 510 may hover a cursor 512 over an area 514 of the display. Alternatively or additionally, the user may click on the area or click and drag to encompass the area. The source code elements transmitted by the user device 510 may cause the corresponding area 524 of the display on the agent device 520 to appear highlighted, thus identifying an area of the web page the user is seeking help with.

Figure 6:
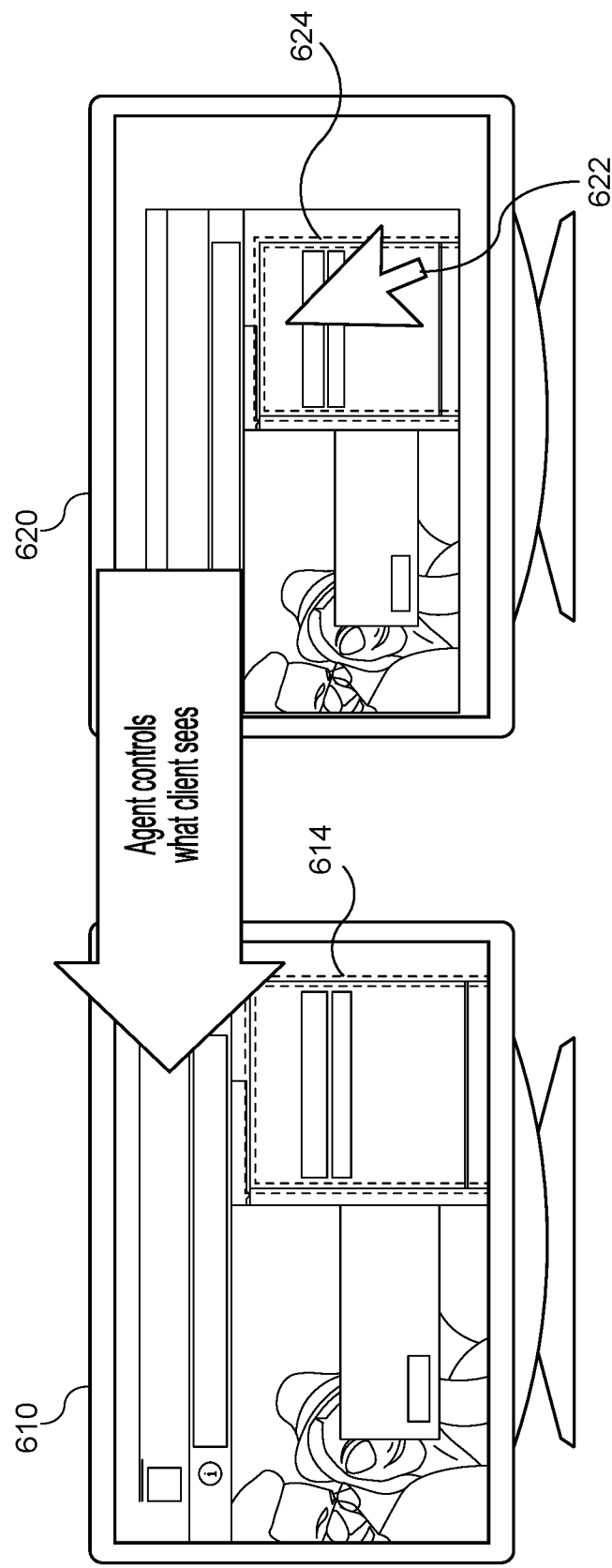
FIG. 6 is a diagram illustrating an example of synchronous communication between an agent computer terminal and a user computer terminal according to some aspects of the present disclosure.

FIG. 6 is a diagram illustrating an example of synchronous communication between an agent device and a user device according to some aspects of the present disclosure. As illustrated in FIG. 6, similar marking, selection, and translation processes according to the feedback process of the present disclosure may be used to enable an agent to provide a modified web page to a user for instructional purposes.

Using synchronous communication, a user device 610 may render a visualization of the source code elements transmitted by an agent device 620. For example, the agent may hover a cursor 622 over an area 624 of the display on the agent device 620. Alternatively or additionally, the agent may click on the area or click and drag to encompass the area. The source code elements transmitted by the agent device 620 may cause the corresponding area 614 of the display on the user device 610 to appear highlighted, thus enabling the agent to provide information or instructions to the user regarding the highlighted portion of the display.

FIG. 7 is a diagram illustrating an example of sending a screenshot for storage in a server database using asynchronous communication according to some aspects of the present disclosure. As illustrated in FIG. 7, the marking, selection, and translation processes according to the feedback process of the present disclosure may be used for asynchronous communication with a website provider enabling the storage of the selection information in a database in a server for subsequent retrieval and analysis by an analyst (e.g., agent).

Referring to FIG. 7, a user may select a target area 714 of a display on the user device 710. For example, the user of the user device 710 may hover a cursor 712 over a target area 714 of the display. Alternatively or additionally, the user may click on the area or click and drag to encompass the area. Selecting the target area 714 may cause the target area 714 to be highlighted and may cause a screenshot image of the display to be generated. Alternatively, an additional action, for example, a right-click of the mouse or a button press, may cause the screenshot to be generated. The generated screenshot image may be stored in a database for future analysis. At a later time, an agent (e.g., analyst) may use an agent terminal 720 to access the screenshot image from the database. The screenshot image, including the highlighted target area 714 to be reproduced as a highlighted area 724 on the agent terminal 720. The screenshot image may enable the analyst to identify the area (e.g. the highlighted area of the display) that the user requested information about and provide the appropriate feedback to the user.

FIG. 8 is a diagram illustrating an example of synchronous communication between a user device and an agent device for assisting in menu navigation according to some aspects of the present disclosure. As illustrated in FIG. 8, each step required to navigate a menu may be marked, selected, translated, and transmitted for rendering on an agent device to enable the agent to walk a user through the steps required for proper navigation of the menu.

Referring to FIG. 8, a user may hover a cursor 812 over a target area of the display of the user device 810. The target area may be a menu 814 having one or more sub-menus 816 (e.g., a complex menu). Hovering the cursor 812 over a particular selection of a menu 814 may cause a related sub-menu 816 to open. In some implementations, when a user wants to capture an expanded menu, but the menu is not expanded when the GUI marking tool is initiated, the user may hold down a keyboard key, expand the menu, and release the keyboard key. Source code elements corresponding to the selected menus 814 and sub-menus 816 on the GUI of the user device 810 may be transmitted by the user device 810 and rendered as menus 824 and sub-menus 826 on the GUI of on the agent device 820, thereby enabling the agent to visualize the GUI as the user moves through the menus and sub-menus. The agent may then provide guidance to the user regarding menu navigation.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for providing user feedback for a website using a graphical user interface (GUI), the method comprising:
   receiving, by a client device, an initiating event;
   in response to the initiating event, generating, via a programming interface of the client device, a substantially transparent overlay for a GUI of a web page, the substantially transparent overlay preventing user interaction with the GUI of the web page, the substantially transparent overlay configured to accept a selection of an area of the web page;
   receiving, by the client device, the selection of an area of the web page on the substantially transparent overlay, wherein selection information comprises at least one of: generated image files, a source code record, state-based information of the GUI, information about a user system, or information about a user;
   rendering, by the client device, web page elements from the selected area on the substantially transparent overlay;
   in response to detecting a concluding event for the selection, translating, by the client device, coordinates of the rendered web page elements on the substantially transparent overlay to corresponding elements on the GUI of the web page;
   identifying, by the client device, GUI source code corresponding to coordinates of the selected web page elements on the GUI of the web page;
   creating an image file including the GUI of the web page and a graphical element rendered on the substantially transparent overlay, the image file created from source code of the GUI of the web page and the graphical element;
   transmitting, by the client device, the source code and selection information for the selected web page element to a remote server;
   storing the source code and selection information on the remote server; and
   associating the source code and selection information stored on the remote server with a user problem report and storing the user problem report, the source code for the element, and the selection information in a database on the remote server.

2. The method of claim 1, wherein the remote computing device is configured to render the elements of the GUI of the web page defined by the source code on a GUI of the remote computing device.

3. The method of claim 1, wherein the initiating event is generated by the remote computing device and transmitted to the client device.

4. The method of claim 1, wherein coordinates of the area on the substantially transparent overlay are received via a user input device.

5. The method of claim 1, wherein the coordinates of the selected web page elements comprise X and Y coordinates at different depths on a Z axis of the web page GUI.

6. The method of claim 1, further comprising accessing, by a remote computing device, the source code and selection information from the remote server at a subsequent time; and
   rendering, by the remote computing device, a representation of the selected area of the web page.

7. A system, comprising:
   a first computing device;
   a second computing device; and
   a server configured to communicate with the first computing device and the second computing device;
   the first computing device configured to perform operations including:
      receiving, from the second computing device, an initiating event;
      in response to the initiating event, generating, via a programming interface of the first computing device, a substantially transparent overlay for a graphical user interface (GUI) of a web page, the substantially transparent overlay operable to prevent user interaction with the GUI of the web page, the substantially transparent overlay configured to accept a selection of an area of the web page;
      receiving, by the first computing device, the selection of an area of the web page on the substantially transparent overlay, wherein selection information comprises at least one of: generated image files, a source code record, state-based information of the GUI, information about a user system, or information about a user;

rendering, by the first computing device, web page elements from the selected area on the substantially transparent overlay;

in response to detecting a concluding event for the selection, translating coordinates of the rendered web page elements on the substantially transparent overlay to corresponding elements on the GUI of the web page;

identifying, by the first computing device, GUI source code corresponding to the coordinates of the selected web page elements on the GUI of the web page;

creating an image file including the GUI of the web page and a graphical element rendered on the substantially transparent overlay, the image file created from source code of the GUI of the web page and the graphical element;

transmitting, by the first computing device, the source code and selection information for the selected web page element to the server; and storing the source code and selection information on the server, wherein the server is configured to associate the source code and selection information with a user problem report and store the user problem report, the source code for the element, and the selection information for the element in a database on the server.

8. The system of claim 7, wherein the second computing device is configured to render the elements of the GUI of the web page defined by the source code on the web page GUI of the second computing device.

9. The system of claim 7, wherein the second computing device is configured to render the elements of the GUI of the web page defined by the source code on a GUI of the second computing device.

10. The system of claim 7, wherein the initiating event is generated by the second computing device and transmitted to the first computing device.

11. The system of claim 7, wherein the coordinates of the area on the substantially transparent overlay are received via a user input device.

12. The system of claim 7, wherein the coordinates of the selected web page elements comprise X and Y coordinates at different depths on a Z axis of the web page GUI.

13. The system of claim 7, wherein the second computing device configured to access the source code and selection information from the server at a subsequent time; and render a representation of the selected area of the web page GUI.

14. A non-transitory computer readable medium having stored therein instructions that are executable for performing operations including:

receiving, by a client device, an initiating event;

in response to the initiating event, generating, via a programming interface of the client device, a substantially transparent overlay for a GUI of a web page, the substantially transparent overlay preventing user interaction with the GUI of the web page, the substantially transparent overlay configured to accept a selection of an area of the web page;

receiving, from an input device, the selection of an area of the web page on the substantially transparent overlay, wherein selection information comprises at least one of: generated image files, a source code record, state-based information of the GUI, information about a user system, or information about a user;

rendering, by the client device, web page elements from the selected area on the substantially transparent overlay;

in response to detecting a concluding event for the selection, translating, by the client device, coordinates of the rendered web page elements on the substantially transparent overlay to corresponding elements on the GUI of the web page;

identifying, by the client device, GUI source code corresponding to coordinates of the selected web page elements on the GUI of the web page;

creating an image file including the GUI of the web page and a graphical element rendered on the substantially transparent overlay, the image file created from source code of the GUI of the web page and the graphical element; and transmitting, by the client device, the source code and selection information for the selected web page element to a remote server, wherein the server is configured to associate the source code and selection information with a user problem report and store the user problem report, the source code for the element, and the selection information in a database on the server.

15. The non-transitory computer readable medium as defined in claim 14, wherein the coordinates of the selected web page elements comprise X and Y coordinates at different depths on a Z axis of the web page GUI.

* * * * *